United States Statutory Invention Registration [19]

[11] Reg. Number: H465

Brown [43] Published: May 3, 1988

[54] ACOUSTO-ULTRASONIC MONITORING

[75] Inventor: Scott C. Brown, Sacramento, Calif.

[73] Assignee: The United States of America as represented by the Secretary of the Air Force, Washington, D.C.

[21] Appl. No.: 48,858

[22] Filed: May 12, 1987

[51] Int. Cl.[4] ..... G01N 29/00

[52] U.S. Cl. ..... 73/590; 73/599

[58] Field of Search ..... 73/590, 599; 374/53; 162/49

[56] References Cited

U.S. PATENT DOCUMENTS

| | | | |
|---|---|---|---|
| 3,654,072 | 4/1972 | Massa | 162/49 |
| 4,325,255 | 4/1982 | Howard et al. | 73/589 |
| 4,327,587 | 5/1982 | Docekal et al. | 73/590 |
| 4,428,237 | 1/1984 | Zeger et al. | 73/602 |
| 4,469,450 | 9/1984 | DiVincenzo | 73/146 |
| 4,494,408 | 1/1985 | DeLacy | 73/599 |
| 4,552,781 | 11/1985 | Cannady, Jr. et al. | 427/57 |
| 4,590,803 | 5/1986 | Harrold | 73/590 |

*Primary Examiner*—Stephen C. Buczinski
*Assistant Examiner*—Linda J. Wallace
*Attorney, Agent, or Firm*—Bobby D. Scearce; Donald J. Singer

[57] ABSTRACT

An ultrasonic nondestructive system and method for monitoring resin cure during composite sheet material fabrication is described which comprises a first transducer for directing a plurality of ultrasonic pulses of preselected pulse frequency along a selected propagation axis onto a first surface of the material during the curing of the resin, a second transducer near the second surface of the material for receiving transmitted pulses and for providing output signals characteristic of the transmitted pulses, and electronic signal processor and display equipment responsive to signals from the second transducer for analyzing the signals and providing output corresponding to the amplitude and duration of the transmitted pulses.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACOUSTO-ULTRASONIC MONITORING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to nondestructive testing methods utilizing ultrasonics, and more particularly to improved system and method for in-process monitoring of resin cure within composite sheet material during fabrication.

The invention provides system and method for acousto-ultrasonic monitoring of the cure of resin impregnated fabric composite materials during fabrication thereof. The invention is useful particularly for monitoring the cure of phenolic resin based composite materials in the processing environment. In accordance with the teachings hereof, composite sheet material being monitored is impressed with an ultrasonic pulse and the attenuation of the resultant transient elastic stress wave is observed after it has passed through the material. The incident ultrasonic wave is generated by applying a voltage pulse across a first piezoceramio transducer. The compression wave thus produced is received by a second piezoceramic transducer which generates an output voltage signal characteristic of the attenuation of the wave passing through the material. Change in output of the second transducer is directly related to propagation efficiency of the medium between the first and second transducers. For a given material, the propagation efficiency is directly related to the condition of the material along the propagation path.

It is therefore a principal object of the invention to provide an improved ultrasonic nondestructive testing system and method.

It is a further object of the invention to provide an improved nondestructive ultrasonic testing system and method for in-process testing of composite materials.

It is yet another object to provide system and method for in-process monitoring of resin cure during composite fabrication.

These and other objects of the invention will become apparent as the detailed description of representative embodiments proceeds.

SUMMARY OF THE INVENTION

In accordance with the foregoing principles and objects of the invention, an ultrasonic nondestructive system and method for monitoring resin cure during composite sheet material fabrication is described which comprises a first transducer for directing a plurality of ultrasonic pulses of preselected pulse frequency along a selected propagation axis onto a first surface of the material during the curing of the resin, a second transducer near the second surface of the material for receiving transmitted pulses and for providing output signals characteristic of the transmitted pulses, and electronic signal processor and display equipment responsive to signals from the second transducer for analyzing the signals and providing output corresponding to the amplitude and duration of the transmitted pulses.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
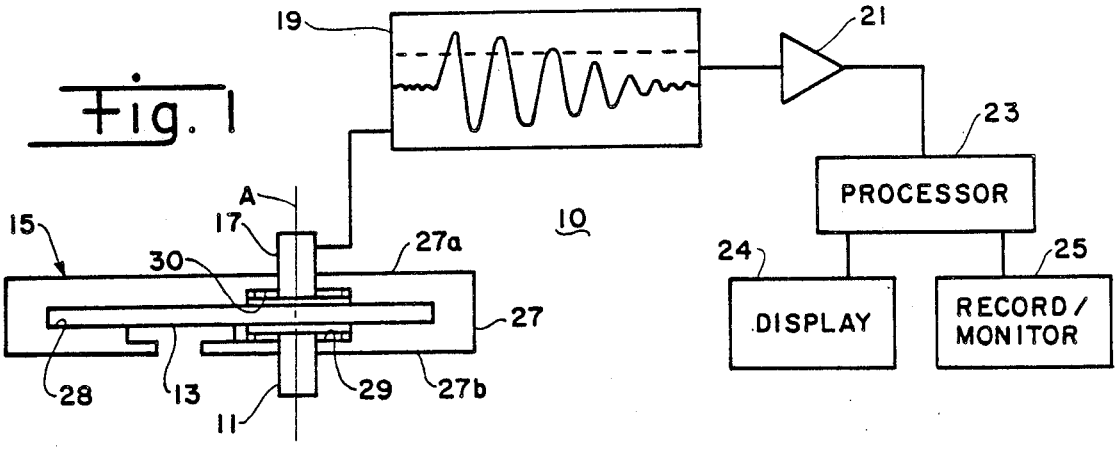
FIG. 1 is a schematic of the acousto-ultrasonic system of the invention, including a representative test fixture useful in practicing the method of the invention.

Referring now to the drawings, FIG. 1 is a schematic of a representative acousto-ultrasonic system 10 of the invention. System 10 comprises a first ultrasonic transducer 11 for generating ultrasonic pulses of preselected frequency to be impressed onto composite sheet sample 13 for producing elastic displacements within sample 13. In the practice of the invention, sample 13 may comprise thermally cured resin formulations of substantially any type the method being particularly applicable to monitoring cure of condensation polymers in composite sheet material of from about 0.10 to 2.54. mm in thickness and cured at temperatures of up to about 165° C. Sample 13 may be held within a suitable test fixture 15. The elastic displacements produced within sample 13 by the transmission of ultrasonic pulses from transducer 11 are directed along a propagation axis A substantially normal to the surfaces of sample 13 for detection by a second acoustic emission transducer 17 which senses short duration elastic displacements within sample 13 and transduces them to electrical output signals 19 characteristic of the ultrasonic energy transmitted through sample 13. Signal 19 is transmitted to preamplifier 21 and further to suitable electronics including signal processor 23 for analyzing signal 19 and providing a corresponding output to display 24 or recorder/monitor 25.

In a system 10 built in demonstration of the invention, each transducer 11,17 comprised a lead zirconate titanate piezoceramic crystal (PZT-5A, Physical Acoustics Corporation); preamplifier 21 Was a model AET 160B (Acoustic Emission Technology Corporation) which provided 60 db$\times 10^3$ of gain and also bandpassed signal 19 from transducer 17; the bandpass filter was Model FL25 with a bandpass of 250 to 500 kHz. The gain added to signal 19 by preamplifier 21 made the total system sensitive to very low (12 db) amplitude signals. Processor 23 was a microcomputer based model AET-5000. Pulser transducer 11 had a one pulse per second repetition rate which generated a 250 V spike. Pulse frequency for system 10 may, however, range from about 100 to 300 Hz in the practice of the method of the invention.

Figure 2:
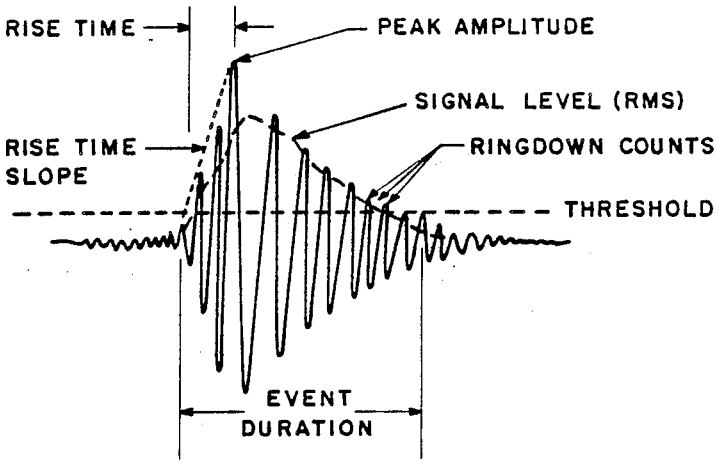
FIG. 2 is an illustration of a characteristic signal produced in the practice of the method of the invention.

A typical signal 19 from sensing transducer 17 is shown in FIG. 2, including various characteristic features monitored by processor 23. The features of signal 19 are affected by the condition of the composite sample through which a given pulse from transducer 11 is transmitted. Features providing parameters for analysis of the condition of the sample according to the invention include ultrasonic pulse peak amplitude and event duration, rise time and slope to peak amplitude, ringdown counts, signal level and threshold level for transducer 17. Rise time and event duration are measured during the time interval that the signal level exceeds threshold. The parameters most sensitive to ultrasonic wave propagation analysis are peak amplitude, event duration, ringdown counts, and an energy dependent term (velocity and amplitude). These parameters are included in an analyses of examples described below in relation to FIGS. 4 and 5.

In the examination of composite samples 13 in demonstration of the invention, test fixture 15 comprised a substantially flat 4×4 inch frame 27 as shown in FIG. 1, including upper plate 27*a* and lower plate 27*b* defining therebetween opening 28 for receiving sample 13 of about 0.625 cm thickness for examination. A first opening 29 was defined in lower plate 27*b* for receiving and holding transducer 11 in contact with a first surface of sample 13; a second opening 30 in upper plate 27*a* held transducer 17 in contact with the second surface of sample 13 and in registration with transducer 11. Fixture 15 was configured so that several signal paths through sample 13 could be accommodated.

Figure 3:
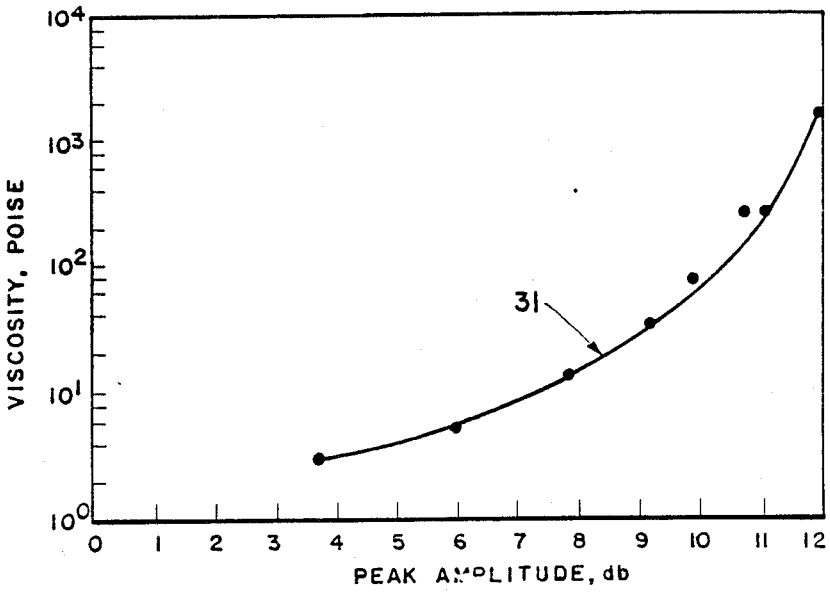
FIG. 3 is a graph of the correlation of acousto-ultrasonic signal with dynamic viscosity.

Experiments were conducted utilizing system 10 to determine the feasibility of using transducers 11,17 to monitor cure of phenolic resin in correlating ultrasonic signal with viscosity of resin during cure utilizing actual rheological measurements, primarily to determine if volatiles emitted during the phenolic cure process would form surface bubbles, and therefore discontinuities, at the sample/transducer interfaces which would distort the transmitted signal. Test fixture 15 was filled with liquid resin and fitted with transducers 11,17 and placed into an oven at ambient pressure and heated to cure the resin. Two such experiments were conducted at isothermal cure temperatures of 93° C. and 122° C. Standard viscosity measurements on the samples were made using a Rheometrics viscoelastic tester at the same temperatures utilizing 50 mm diameter plates with a 0.6 mm sample gap at a strain rate of 10 radians per second to about 50% maximum strain. During heating, the resin was monitored for peak amplitude and energy changes. In the 93° C. tests, severe bubbling and void pocket formation occured. Increasing the temperature to 121° C. resulted in more rapid removal of the solvent from the resin, which reduced the corresponding signal distortion. FIG. 3 shows a plot 31 of peak amplitude versus viscosity resulting from the foregoing experiments in the correlation of acousto-ultrasonic signal with dynamic viscosity showing a rapid increase in signal with viscosity.

Figure 4:
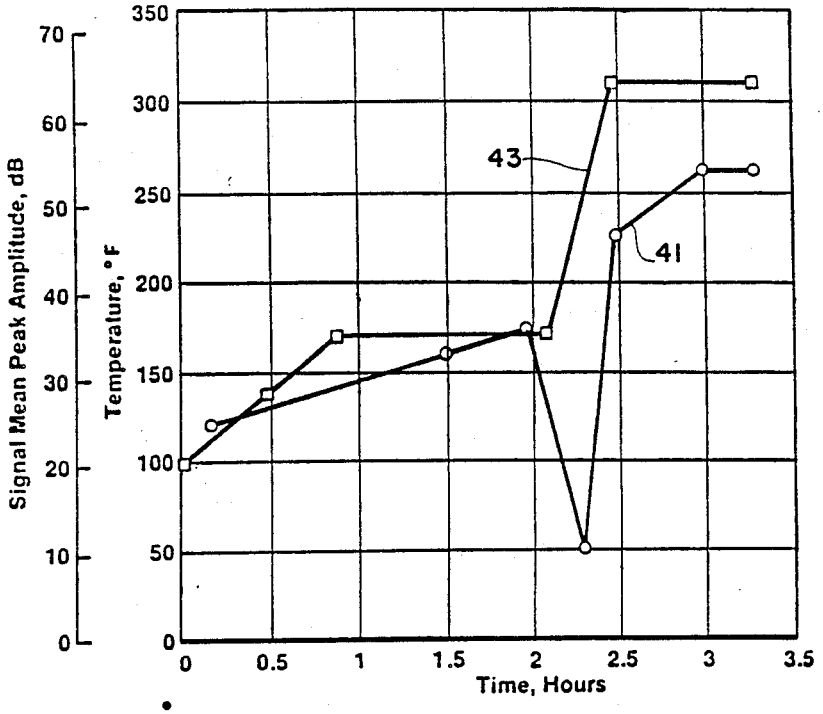
FIG. 4 is a graph of change in mean peak amplitude for autoclave cure of phenolic/carbon prepreg.

Samples 13 of FM 5064 prepreg phenolic resin impregnated graphite broadgoods (U.S. Polymeric Corp) were tested in system 10 within an autoclave to demonstrate the applicability of the invention to testing of composite materials. The resin in these samples was B-staged on the carbon fabric to preclude to the extent practicable the production of volatiles during cure. FIG. 4 shows a plot 41 of change in mean peak amplitude for autoclave cure of the prepreg, indicating definite changes in peak amplitude during cure. Plot 43 shows the autoclave temperature program. Prior to flow of the B-staged resin, the signal is poor. Once wetting has occurred during the flow period at the first hold temperature (80° C.) the signal becomes greatly improved. As the temperature rises above the 80° C. hold, the signal strength drops, corresponding to a loss in resin viscosity. The peak amplitude reaches a minimum as higher temperatures are reached, corresponding to an increase in viscosity due to resin advancement. Finally, at the end of the cycle, the peak amplitude plot 41 reaches substantially constant value upon cure completion.

For the monitoring of composite laminates by ultrasonics, 20 plies of FM 5064 prepreg were placed in the test fixture. The layup consisted of prepreg, three plies of bleeder cloth, and one ply of breather material. Two thermocouples were inserted between the plies of the prepreg. A vacuum bag was placed over the top fixture. The fixture was then placed in an autoclave and subjected to predetermined pressure and temperature conditions which represent the standard cure cycle. A total of nine experimental runs were made: one for sensor calibration, two on epoxy/graphite prepreg to confirm the previous baseline, and six on the phenolic/carbon prepreg.

Figure 5:
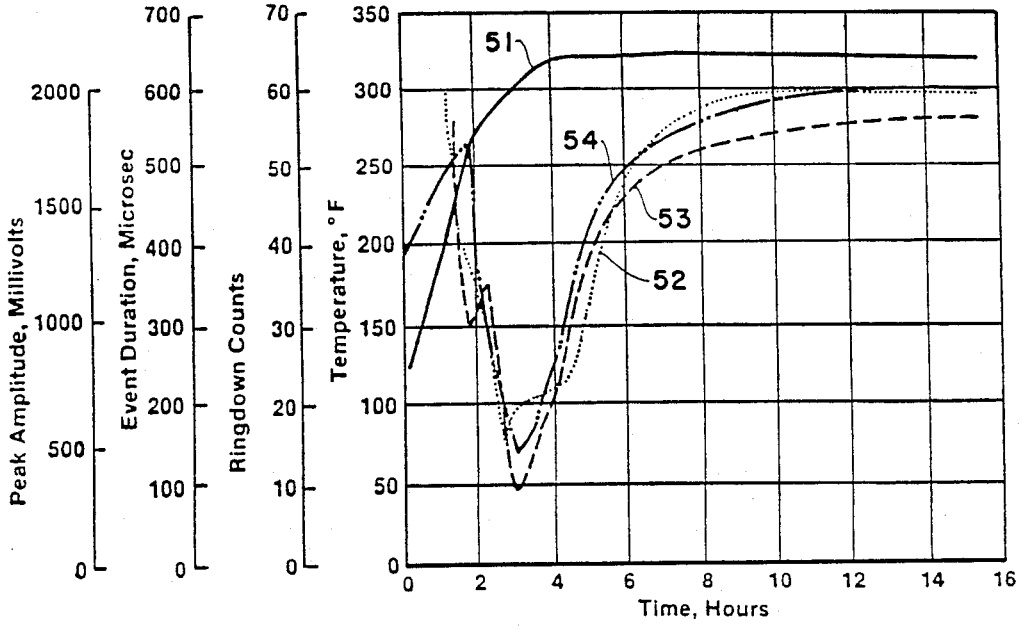
FIG. 5 is a graph of various acousto-ultrasonic parameters versus temperature for autoclave cure of FM 5064.

FIG. 5 is a graph of various acousto-ultrasonic parameters versus temperature for autoclave cure of the FM 5064 samples. Several signal features were monitored, each showing the same type of transition occurring, though minor variations in curve shape and degree of data scatter exist between parameters. Plot 51 shows the temperature program for cure of the samples. Plot 52 shows change in peak amplitude of transmitted pulses with cure time, plot 53 shows ringdown counts with cure time, and plot 54 shows change of event duration with cure time.

It is therefore seen that cure of resin impregnated composite sheet materials at cure temperatures in the range of from about 145° to 165° C. may be monitored according to the teachings of the invention. Composite sheet thickness of about 0.635 to 2.54 cm may best be accommodated. The invention may be particularly applicable to monitoring the cure of composites comprising condensation polymers or resins of the polyimide and phenolic types.

The invention as herein described therefore provides an acousto-ultrasonic system and method for monitoring resin cure during composite fabrication. It is understood that modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A system for monitoring resin cure in the fabrication of composite sheet material, comprising:

(a) first transducer means for directing a plurality of ultrasonlc pulses of preselected pulse frequency along a selected propagation axis onto a first surface of composite sheet material containing resin for curing;

(b) second transducer means disposed along said axis near the second surface of said material for receiving the ultrasonic pulses transmitted through said material and for providing output signals characteristic of the transmitted pulses received by said second transducer means; and (c) electronic means responsive to said signals from said second transducer means for analyzing said signals and providing output corresponding to the amplitude and duration of said transmitted pulses.

2. The system recited in claim 1 wherein said preselected frequency is in the range of from about 100 to about 300 KHz.

3. A method for monitoring resin cure in the fabrication of composite sheet material comprising the steps of:

(a) directing a plurality of ultrasonic pulses of preselected pulse frequency along a selected propagation axis onto a first surface of composite sheet material containing resin for curing;

(b) receiving the ultrasonic pulses transmitted through said material and providing output signals characteristic of the transmitted pulses; and (c) analyzing said signals and providing output corresponding to the amplitude and duration of said transmitted pulses.

4. The method recited in claim 3 wherein said preselected frequency is in the range of from about 100 to about 300 KHz.

* * * * *